United States Patent
Ray et al.

(10) Patent No.: US 8,559,912 B2
(45) Date of Patent: *Oct. 15, 2013

(54) SYSTEM AND METHOD FOR PROVIDING CONTACT INFORMATION OF AN OUT OF AREA MOBILE DEVICE TO A REVERSE 911 DATABASE

(71) Applicant: CenturyLink Intellectual Property LLC, Denver, CO (US)

(72) Inventors: Amar N. Ray, Shawnee, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,984

(22) Filed: Feb. 28, 2013

(65) Prior Publication Data

US 2013/0178184 A1 Jul. 11, 2013

Related U.S. Application Data

(63) Continuation of application No. 12/255,428, filed on Oct. 21, 2008, now Pat. No. 8,412,149.

(51) Int. Cl.
*H04M 11/04* (2006.01)

(52) U.S. Cl.
USPC .................. 455/404.1; 455/404.2; 455/435.1

(58) Field of Classification Search
USPC ................................ 455/404.1, 404.2, 435.1
See application file for complete search history.

(56) References Cited

U.S. PATENT DOCUMENTS

| | | |
|---|---|---|
| 5,307,400 A | 4/1994 | Sawyer et al. |
| 6,044,259 A | 3/2000 | Hentila et al. |
| 6,091,946 A | 7/2000 | Ahvenainen |
| 6,108,537 A | 8/2000 | Comer et al. |
| 6,721,755 B1 | 4/2004 | Lee |
| 6,941,139 B1 | 9/2005 | Shupe et al. |
| 7,177,623 B2 | 2/2007 | Baldwin |
| 7,280,830 B2 | 10/2007 | Anderson et al. |
| 7,474,894 B2 | 1/2009 | Cardina et al. |
| 7,664,233 B1 | 2/2010 | Kirchmeier et al. |
| 7,706,356 B1 * | 4/2010 | Olshansky et al. ........... 370/352 |

(Continued)

OTHER PUBLICATIONS

U.S. Appl. No. 12/255,451; Notice of Allowance dated Feb. 16, 2012; 5 pages.

(Continued)

*Primary Examiner* — Olumide T Ajibade Akonai
*Assistant Examiner* — Jaime Holliday
(74) *Attorney, Agent, or Firm* — Swanson & Bratschun, L.L.C.

(57) ABSTRACT

A system and method for registering the contact information of mobile devices with a service 911 service is presented. In one embodiment, a mobile switching center receives the contact information of a mobile device. If the mobile switching center determines that the mobile device is not located within a particular wireless sub-network, such as, but not limited to, a wireless sub-network associated with an area code registered to the mobile device, the mobile switching center generates a reverse 911 registration text message and transmits the reverse 911 registration text message to the mobile device. A user of the mobile device may then transmit the reverse 911 registration text message to a local reverse 911 database to have the contact information associated with the mobile device added to the local reverse 911 database.

18 Claims, 7 Drawing Sheets

(56) References Cited

U.S. PATENT DOCUMENTS

| | | | |
|---|---|---|---|
| 7,831,240 | B2 | 11/2010 | Patron et al. |
| 8,280,343 | B2 | 10/2012 | Ray et al. |
| 8,412,149 | B2 | 4/2013 | Ray et al. |
| 8,437,734 | B2 | 5/2013 | Ray et al. |
| 2004/0208295 | A1* | 10/2004 | Cacioppo et al. ............... 379/45 |
| 2004/0248570 | A1 | 12/2004 | Denenberg et al. |
| 2005/0090253 | A1 | 4/2005 | Kim et al. |
| 2005/0277412 | A1 | 12/2005 | Anderson et al. |
| 2007/0202927 | A1 | 8/2007 | Pfeging et al. |
| 2007/0298758 | A1 | 12/2007 | Verma et al. |
| 2009/0135008 | A1 | 5/2009 | Kirchmeier et al. |
| 2009/0248828 | A1 | 10/2009 | Gould et al. |
| 2010/0099374 | A1 | 4/2010 | Ray et al. |
| 2010/0099376 | A1 | 4/2010 | Ray et al. |
| 2012/0329422 | A1 | 12/2012 | Ray et al. |

OTHER PUBLICATIONS

U.S. Appl. No. 12/255,451; Notice of Allowance dated Jun. 6, 2012; 20 pages.

U.S. Appl. No. 12/255,451; Issue Notification dated Sep. 12, 2012; 1 page.

U.S. Appl. No. 12/255,451; Non-Final Rejection dated Jun. 9, 2011; 16 pages.

U.S. Appl. No. 12/255,451; Final Rejection dated Nov. 8, 2011; 27 pages.

U.S. Appl. No. 12/255,428; Final Office Action dated Jan. 13, 2012; 19 pages.

U.S. Appl. No. 12/255,428; Non-Final Rejection dated Jun. 14, 2011; 30 pages.

U.S. Appl. No. 12/255,428; Notice of Allowance dated Nov. 30, 2012; 27 pages.

U.S. Appl. No. 12/255,428; Issue Notification dated Mar. 13, 2013; 1 page.

U.S. Appl. No. 13/604,097; Non-Final Rejection dated Oct. 4, 2012; 8 pages.

U.S. Appl. No. 13/604,097; Notice of Allowance dated Oct. 30, 2012; 12 pages.

U.S. Appl. No. 13/604,097; Notice of Allowance dated Jan. 18, 2013; 8 pages.

U.S. Appl. No. 13/604,097; Issue Notification dated Apr. 17, 2013; 1 page.

* cited by examiner

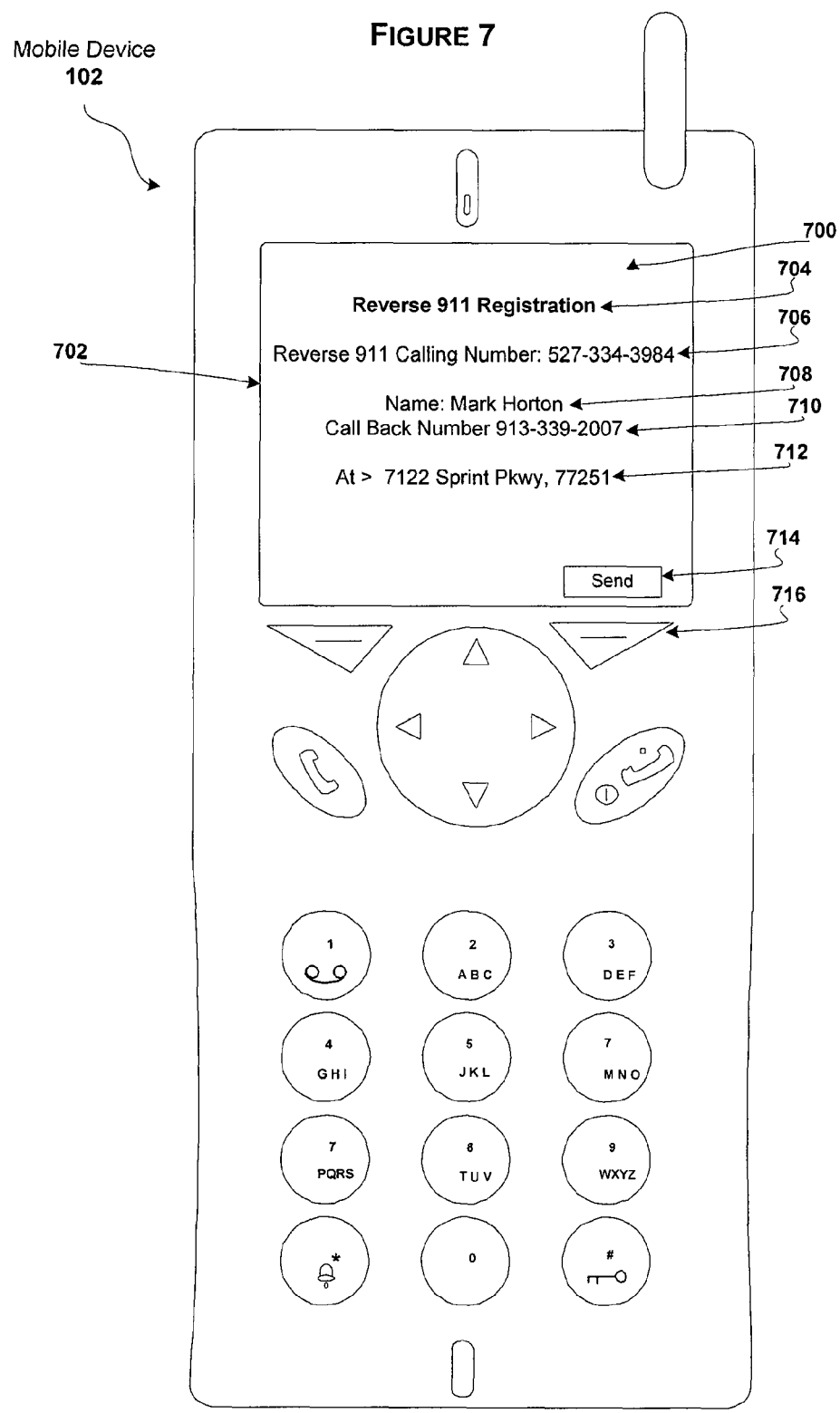

SYSTEM AND METHOD FOR PROVIDING CONTACT INFORMATION OF AN OUT OF AREA MOBILE DEVICE TO A REVERSE 911 DATABASE

CROSS REFERENCE TO RELATED APPLICATION

This application is a continuation of U.S. patent application Ser. No. 12/255,428, filed Oct. 21, 2008 by Amar N. Ray et al. and entitled, "System and Method for Providing Contact Information of an Out of Area Mobile Device to a Reverse 911 Database,", which is hereby incorporated by reference in its entirety.

BACKGROUND OF THE INVENTION

Reverse 911 is a communications tool that uses a combination of database and GIS mapping technologies to deliver outbound notifications to communities and organizations. For example, reverse 911 allows emergency services to inform the public of a known hazard and/or emergency. However, cellular or voice over IP (VoIP) phone numbers are not automatically entered in the reverse 911 system database. In some locations, if a user would like to be contacted via a cell phone by the reverse 911 system, the user may register online or by filling out a physical form with the contact information associated with a cellular device.

BRIEF SUMMARY OF THE INVENTION

Embodiments of the present invention include a method for providing contact information associated with an out of area mobile device to a reverse 911 database. The method includes receiving the contact information associated with a mobile device at a mobile switching center. The method determines whether the mobile device is within a particular wireless sub-network. In response to the mobile device not being within the particular wireless sub-network, the method generates a text message for providing the contact information of the mobile device to the reverse 911 database. The method transmits the text message to the mobile device and the contact information associated with the mobile device is added to the reverse 911 database in response to the reverse 911 database receiving the text message from the mobile device.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 7 depicts an embodiment of a text message for providing contact information associated with a mobile device to a reverse 911 database.

DETAILED DESCRIPTION OF THE INVENTION

The disclosed embodiments recognize the problems associated with the current process of registering a mobile device, such as a cell phone, with a reverse 911 system. First and foremost, a user must be aware of the existence of the reverse 911 system and must also be aware of the ability to register a phone number of a mobile device with the reverse 911 system. Second, the process requires a user to actually manually register the mobile device. Finally, the reverse 911 system does not account for the current location of the user/mobile device at the time of an emergency. For example, suppose the user's registered location is San Diego, Calif. If the user travels to Dallas, Tex. and an emergency occurs in Dallas during his visit, notifications sent using the reverse 911 system would not be sent to the user's mobile device. Thus, certain of the disclosed embodiments provide a system and method for providing contact information of a mobile device to a reverse 911 database that may overcome one or more of the recognized disadvantages of the current system.

Figure 1:
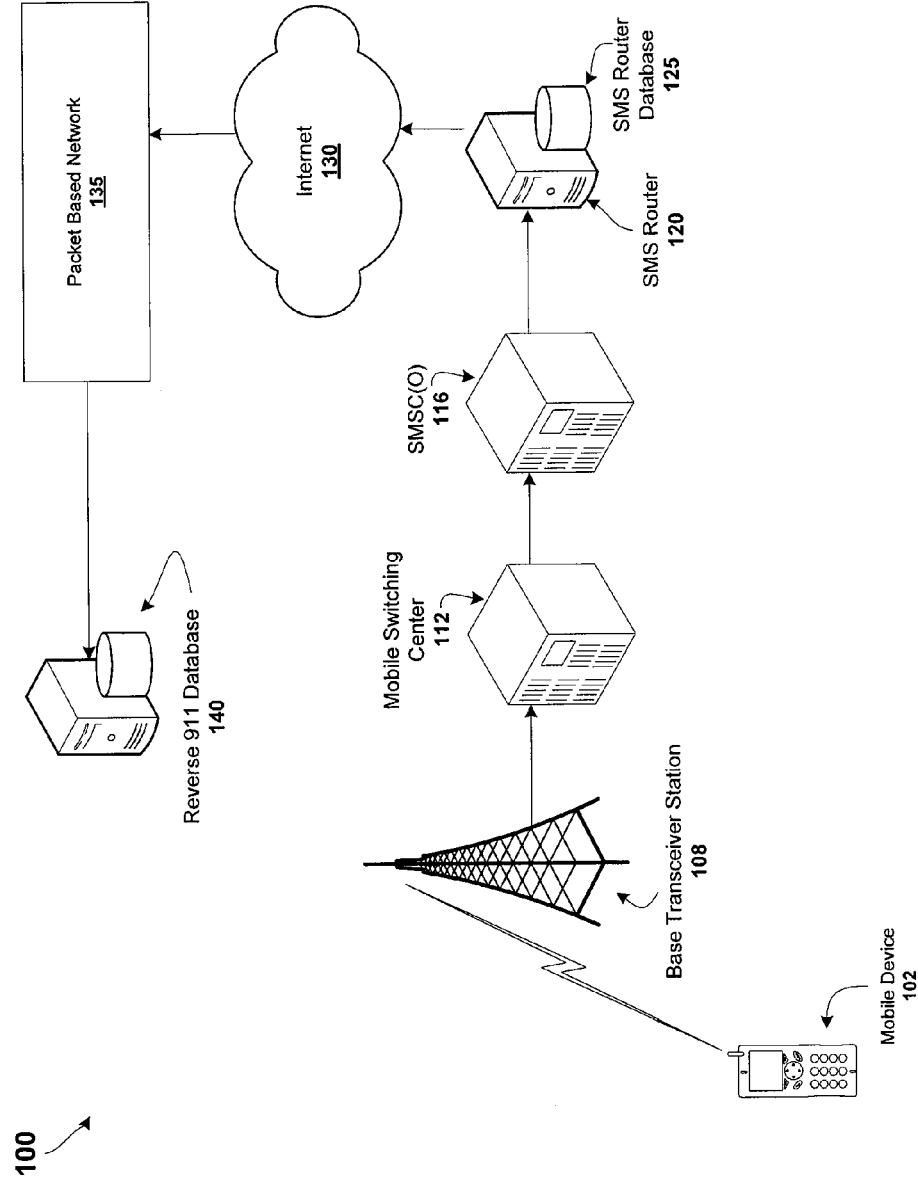
FIG. 1 depicts an embodiment of a network environment in which the illustrative embodiments may be implemented.
Figure 2:
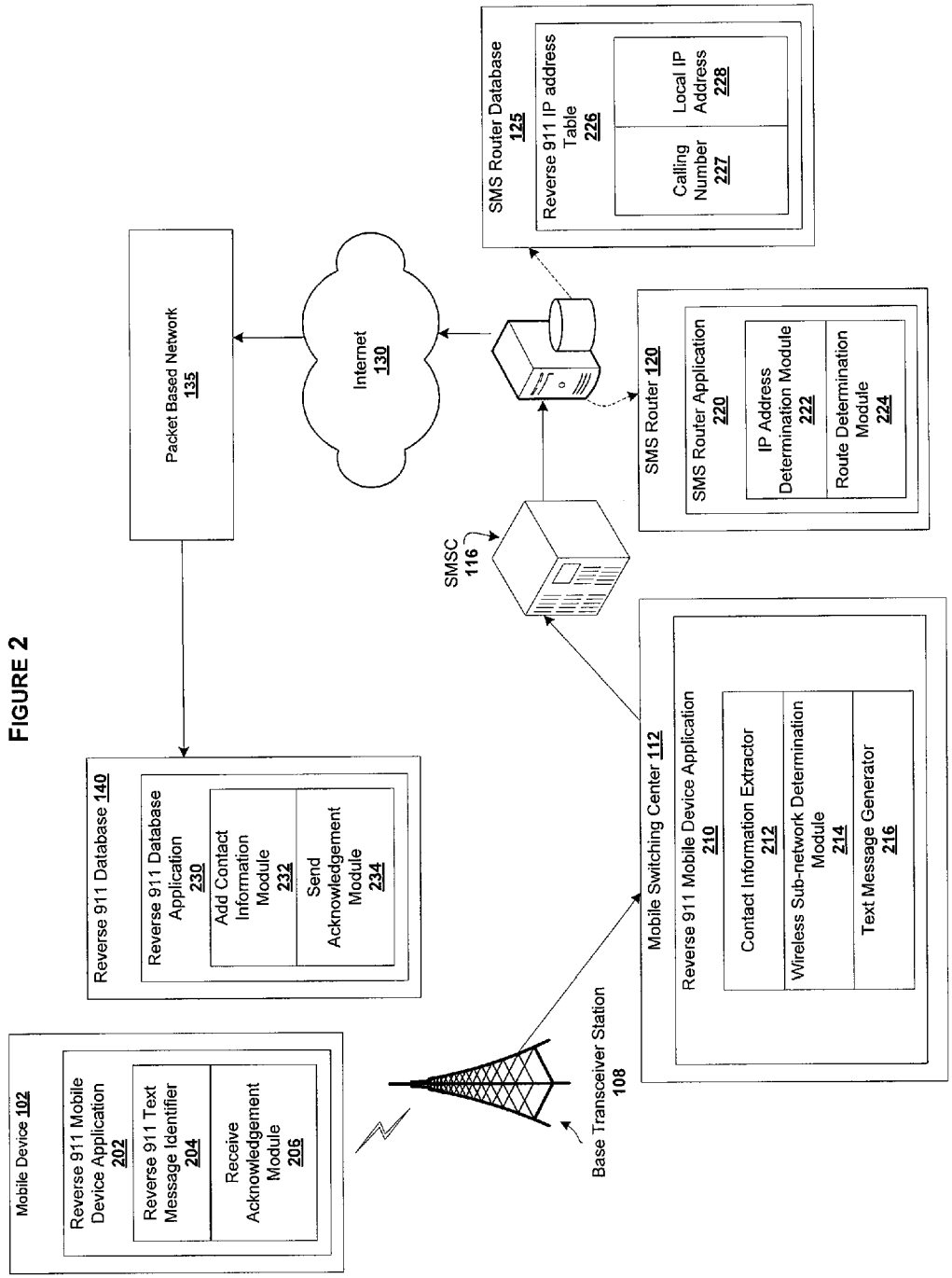
FIG. 2 depicts embodiments of applications executed within the network environment illustrated in FIG. 1 for providing contact information associated with a mobile device to a reverse 911 database.
Figure 3:
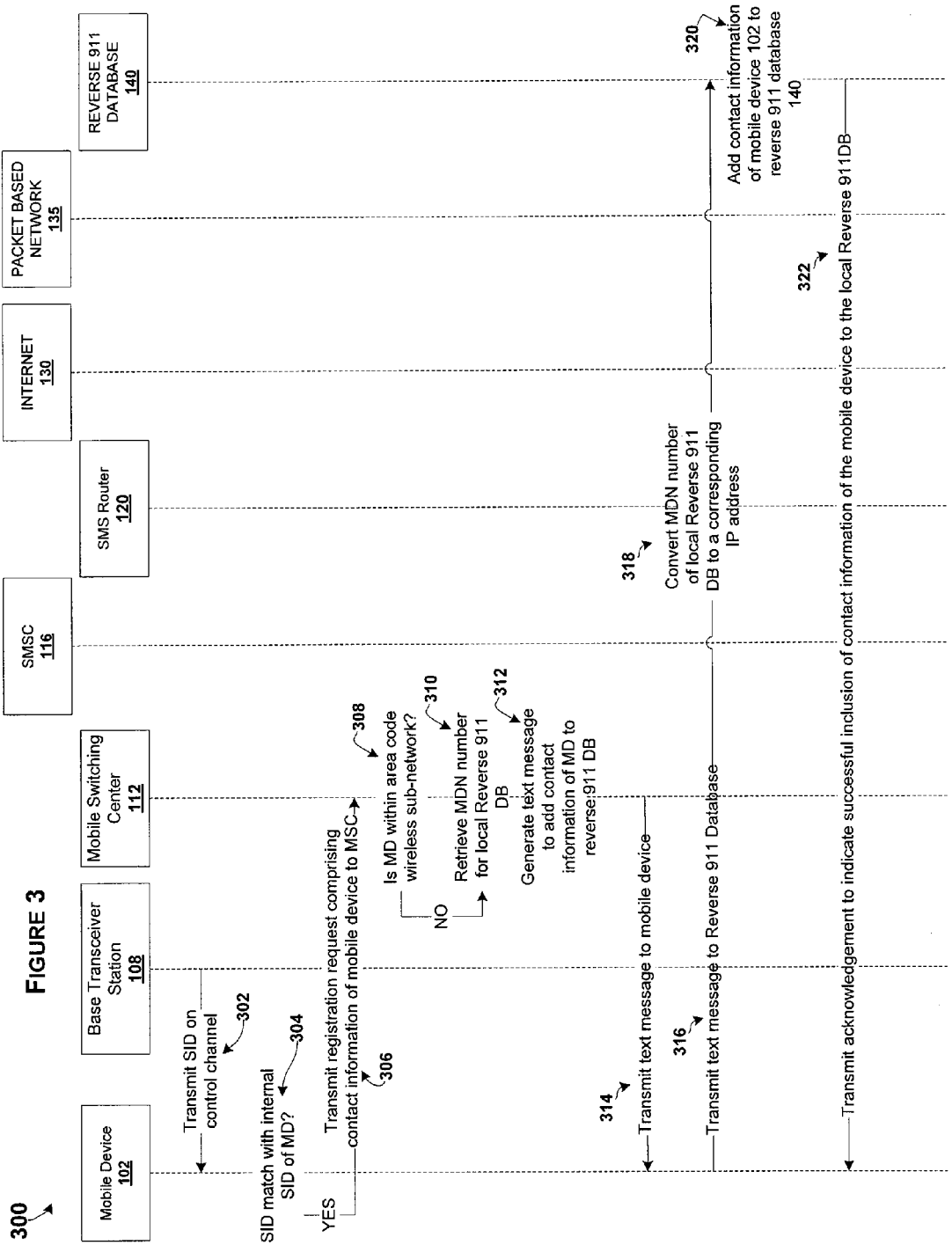
FIG. 3 is a sequence diagram illustrating an embodiment for providing contact information associated with a mobile device to a reverse 911 database.

With reference now to the figures and in particular with reference to FIGS. 1-3, exemplary diagrams of network environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a network environment 100 in which the illustrative embodiments may be implemented for providing contact information associated with a mobile device 102 to a reverse 911 database 140. In the depicted embodiment, mobile device 102 communicates wirelessly with a base transceiver station 108. Mobile device 102 is a hand-held computing and/or communication device such as, but not limited to, cellular phones and personal digital assistants (PDAs). Mobile device 102 may be used to communicate with other mobile devices and/or computing devices over network environment 100. In some embodiments, mobile device 102 may also have wireless capability to communicate with other mobile devices and/or computing devices over the Internet. Additionally, in some embodiments, mobile device 102 may be used to send and receive faxes, email, and text messages.

Network environment 100 is divided geographically into a number of cells, each defined by a radio frequency (RF) radiation pattern from a respective base transceiver station (BTS) antenna such as, but not limited to, base transceiver station 108. Base transceiver station 108 is a piece of equipment that facilitates wireless communication between mobile device 102 and a network, such as, but not limited to, Internet 130 and packet based network 135. In some embodiments, base transceiver station 108 includes a transceiver, a power amplifier for amplifying the signal from the transceiver for transmission through antenna, a combiner for combining feeds from several transceivers so that they could be sent out through a single antenna, and a duplexer for separating sending and receiving signals to/from the antenna. The primary function of base transceiver station 108 is to maintain the air interface, or medium, for communication to any mobile device within its cell, such as, but not limited to, mobile device 102.

Mobile device 102 is associated with special codes/identifiers that are used to identify mobile device 102 and a service provider associated with mobile device 102. Additionally, in some embodiments, the special codes/identifiers may also be used to identify an owner associated with mobile device 102. In some embodiments, when mobile device 102 is powered on, mobile device 102 listens for a system identification code (SID), a unique 5-digit number that is assigned to each carrier by the FCC, on a control channel. The control channel is a special frequency that mobile device 102 and base transceiver station 108 uses to initiate communication (i.e., initiate call setup and channel changing). For example, if mobile device 102 receives an SID, mobile device 102 compares the received SID to an internally programmed SID. If the SIDs match, mobile device 102 knows that base transceiver station 108 is part of its home system. However, if mobile device 102 cannot find a control channel to listen to, mobile device 102 displays a "no service" message.

Along with the SID, mobile device 102 also transmits a registration request to mobile switching center 112 via base transceiver station 108. Mobile switching center 112 is a service delivery node for network environment 100. In one embodiment, mobile switching center 112 is responsible for handling voice calls and short message service (SMS) as well as other services, such as, but not limited to, conference calls, faxes, and circuit switched data. In addition, in some embodiments, mobile switching center 112 sets up and releases the end-to-end connection, handles mobility and hand-over requirements during the call, handles billing charges, and provides real time pre-paid account monitoring.

In one embodiment, the registration request transmitted to mobile switching center 112 includes contact information associated with mobile device 102, such as, but not limited to, the mobile directory number/mobile identification number (MIN) of mobile device 102 and an identifier of a base transceiver station transmitting the registration request, such as, but not limited to, base transceiver station 108. The MIN uniquely identifies mobile device 102 in network environment 100 and, in some embodiments, is also a network-dialable number, i.e., a number that another mobile user or a landline user can dial to reach mobile device 102.

In some embodiments, mobile switching center 112 stores the contact information of mobile device 102 in a location database. Mobile switching center 112 uses this information to determine the location/cellular sub-system to route communications/calls to mobile device 102. In addition, in the depicted embodiment, mobile switching center 112 communicates with short message service center 116 (SMSC 116). SMSC 116 is a network element in network environment 100 which delivers SMS messages, i.e., text message. For example, in one embodiment, when a user sends a text message (SMS message) to another user, SMSC stores the message and delivers the message to the destination user when they are available.

Additionally, in some embodiments, SMSC 116 communicates with one or more SMS routers, such as, but not limited to, SMS Router 120. In one embodiment, SMS Router 120 determines the final destination of received SMS messages and delivers the SMS message to the appropriate components within network environment 100 for processing. For example, in accordance with one embodiment, SMS router 120 communicates with a SMS router database 125 to determine the appropriate IP address to route a SMS message through Internet 130 and packet based network 135 for providing contact information associated with mobile device 102 to reverse 911 database 140.

Internet 130 is a global system of interconnected computer networks that interchange data using the standardized Internet Protocol Suite (TCP/IP). Internet 130 includes millions of private and public networks that are linked by copper wires, fiber-optic cables, wireless connections, and other technologies.

Additionally, in some embodiments, Internet 130 may be communicatively coupled to a packet based network 135 for routing a SMS message to reverse 911 database 140. Packet based network 135 is an interconnected set of networks that are joined by routers or switching routers for transmitting data packets. Packet based network 135 may be implemented as a number of different types of networks, such as, but not limited to, an intranet, a local area network (LAN), or a wide area network (WAN).

Reverse 911 database 140 is one or more databases that store contact information of communication devices, such as, but not limited to, mobile device 102, for delivering outbound notifications to communities and organizations. For example, reverse 911 database 140 enables emergency services to inform the public of a known hazard and/or emergency by using the contact information stored in reverse 911 database 140. Alert notifications may be in the form a recorded voice message and/or in the form of a text message.

FIG. 2 illustrates embodiments of different applications, such as, but not limited to, a reverse 911 mobile device application 202, a reverse 911 mobile device application 210, a SMS router application 220, and a reverse 911 database application 230, executed within network environment 100 for providing the contact information associated with mobile device 102 to reverse 911 database 140. The disclosed applications may be stored in memory and executed by one or more processors on their respective computing device. Additionally, in some embodiments, the functions performed by the disclosed applications of reverse 911 mobile device application 202, reverse 911 mobile device application 210, SMS router application 220, and reverse 911 database application 230 may be implemented in hardware and/or a combination of hardware and software.

In the depicted embodiment, reverse 911 mobile device application 202 includes a reverse 911 text message identifier 204. Reverse 911 text message identifier 204 identifies text messages that contain information for providing the contact information associated with mobile device 102 to reverse 911 database 140, hereinafter referenced as a reverse 911 registration text message. For example, in some embodiments, reverse 911 text message identifier 204 may recognize a particular format and/or certain keywords associated with a reverse 911 registration text message, such as, but not limited to, "Reverse 911 Registration." In other embodiments, reverse 911 text message identifier 204 may recognize a particular data packet and/or instruction code embedded in a reverse 911 registration text message for identifying the text message as a reverse 911 registration text message. Additionally, in some embodiments, in response to identifying a reverse 911 registration text message, reverse 911 text message identifier 204 displays the text message on a display of mobile device 102. Further, in some embodiments, reverse 911 text message identifier 204 monitors for a user response (e.g., a user initiated send command). In one embodiment, if a user response is not received within a specified period of time (e.g., 15 seconds), reverse 911 text message identifier 204 terminates the reverse 911 registration text message. For example, in some embodiments, reverse 911 text message identifier 204 may terminate displaying of the reverse 911 registration text message. Further, in some embodiments, reverse 911 text message identifier 204 may erase the reverse 911 registration text message from memory of mobile device 102.

In some embodiments, reverse 911 mobile device application 202 may also include a receive acknowledgement module 206 for receiving an acknowledgment, as will be further described below, from reverse 911 database 140 of a successful inclusion of the contact information associated with mobile device 102 that is specified in a sent reverse 911 registration text message. In some embodiments, if receive acknowledgement module 206 does not receive a successful acknowledgement from reverse 911 database 140 within a specified period of time (e.g., 60 seconds), receive acknowledgement module 206 may automatically initiate retransmission of the reverse 911 registration text message to reverse 911 database 140.

Additionally, in the depicted embodiment, mobile switching center 112 executes reverse 911 mobile device application 210. In one embodiment, reverse 911 mobile device application 210 includes a contact information extractor 212, a wireless sub-network determination module 214, and a text message generator 216 for providing the contact information associated with mobile device 102 to reverse 911 database 140.

Contact information extractor 212 extracts/identifies the contact information associated with mobile device 102. For example, in one embodiment, contact information extractor 212 identifies the contact information associated with mobile device 102 from a registration request transmitted by mobile device 102 to mobile switching center 112. As previously described, in one embodiment, the registration request transmitted to mobile switching center 112 includes contact information associated with mobile device 102, such as, but not limited to, the mobile directory number/mobile identification number (MN) of mobile device 102 and an identifier of a base transceiver station transmitting the registration request, such as, but not limited to, base transceiver station 108.

Wireless sub-network determination module 214 uses the identifier of the base transceiver station transmitting the registration request to determine the wireless sub-network in which mobile device 102 is currently located. For example, in one embodiment, wireless sub-network determination module 214 identifies the wireless sub-network in which mobile device 102 is currently located by matching the identifier of a base transceiver station transmitting the signal of mobile device 102 to a wireless sub-network using a data table comprising data that correlates base transceiver station identifiers to a particular wireless sub-network. As referenced herein, a wireless sub-network may be a network covered by a particular base transceiver station, a collection of base transceiver stations, a geographic grouping of base transceiver stations, a local exchange carrier network, or any other network or portion thereof.

Text message generator 216 generates a reverse 911 registration text message in response to a determination that mobile device 102 is currently located outside of a particular wireless sub-network, such as, but not limited to, outside of a wireless sub-network associated with an area code registered with mobile device 102. In some embodiments, text message generator 216 determines the contact information for communicating with a local reverse 911 database (e.g., a mobile directory number of the local reverse 911 database) and includes the contact information of the local reverse 911 database in the generated text message. Text message generator 216 transmits the reverse 911 registration text message to mobile device 102.

As will be further described, in response to mobile device 102 transmitting the reverse 911 registration text message, mobile switching center 112 forwards to the reverse 911 registration text message to SMS Router 120 via SMSC 116. In one embodiment, SMS router 120 executes SMS router application 220. In one embodiment, SMS router application 220 includes a IP address determination module 222 and a route determination module 224 for forwarding the contact information associated with mobile device 102 to reverse 911 database 140.

IP address determination module 222 determines the IP address associated with a local reverse 911 database, such as, but not limited to, reverse 911 database 140 for registering the contact information associated with mobile device 102 with a local reverse 911 database via Internet 130. In some embodiments, more than one local reverse 911 database may exist. Additionally, in some embodiments, IP address determination module 222 communicates with SMS router database 125 to determine a corresponding IP address associated with a calling number of a local reverse 911 database that is included in the reverse 911 registration text message. For example, in some embodiments, SMS router database 125 includes a reverse 911 IP address table 226 for correlating a calling number 222 with a respective local IP address 224. In one embodiment, SMS router database 125 receives the calling number of a local reverse 911 database and the cell code ID (CCID) in which mobile device 102 is currently located and returns the IP address of the appropriate reverse 911 database using SMS router database 125. In some embodiments, SMS router database 125 may be populated manually and/or automatically by reverse 911 database 140 via Internet 130.

Route determination module 224 determines the route (i.e., path from one network device to another) for transmitting the reverse 911 registration text message to reverse 911 database 140. For example, in one embodiment, route determination module 224 routes the reverse 911 registration text message by using a routing table stored in SMS router database 125 that contains the pre-defined routes for a connection.

Lastly, in the depicted embodiment, reverse 911 database 140 executes reverse 911 database application 230 for adding contact information associated with mobile device 102 to reverse 911 database 140. In one embodiment, reverse 911 database application 230 includes a add contact information module 232 and a send acknowledgement module 234.

In one embodiment, add contact information module 232 extracts/identifies the contact information associated with mobile device 102 from a received reverse 911 registration text message. Add contact information module 232 then adds the contact information associated with mobile device 102 to reverse 911 database 140.

In some embodiments, send acknowledgement module 234 determines whether the contact information associated with mobile device 102 was successfully added to reverse 911 database 140. In one embodiment, if the contact information associated with mobile device 102 was successfully added to reverse 911 database 140, send acknowledgement module 234 transmits an acknowledgment to mobile device 102 indicating a successful inclusion of the contact information associated with mobile device 102 to reverse 911 database 140. For example, in some embodiments, send acknowledgement module 234 may return a HTTP response status code 200 OK acknowledgment, as defined in RFC 2616, to represent a successful inclusion of the contact information of mobile device 102 by reverse 911 database 140. In other embodiments, the acknowledgment of a successful inclusion by reverse 911 database 140 may be in the form a specific tone, such as, but not limited to, a tone corresponding a particular telephone key (e.g., the # key).

With reference now to FIG. 3, a sequence diagram 300 illustrating an embodiment for providing contact information associated with a mobile device to a reverse 911 database is presented. Sequence diagram 300 depicts a sequence of communications occurring between the components of network 100 in accordance with one embodiment.

Sequence diagram 300 begins with base transceiver station 108 transmitting a system identification code (SID), a unique 5-digit number that is assigned to each carrier by the FCC, on the control channel at step 302. In response to mobile device 102 receiving the SID, mobile device 102 compares the received SID with an internal SID to determine whether the SIDs match at step 304. If the SIDs match, mobile device 102 knows that base transceiver station 108 is part of its home system and transmits a registration request that includes the contact information of mobile device 102 to mobile switching center 112 via base transceiver station 108 at step 306. In essence, the registration request enables mobile switching center 112 to locate mobile device 102 in the event of an incoming call.

In one embodiment, at step 308, mobile switching center 112 determines whether the mobile device 102 is within a wireless sub-network associated with mobile device 102's assigned area code. If mobile device 102 is not within the wireless sub-network associated with mobile device 102's assigned area code, mobile switching center 112 retrieves the mobile directory number (i.e., the calling number) of a local reverse 911 database for the wireless sub-network in which mobile device 102 is currently located at step 310. For example, in some embodiments, mobile switching center 112 queries a database for the calling number associated with the current wireless sub-network. In other embodiments, mobile switching center 112 may simply be assigned/know the calling number of the local 911 database. At step 312, mobile switching center 112 generates a text message to add the contact information of mobile device 102 to reverse 911 database 140 (i.e., the local reverse 911 database). In one embodiment, the calling number of the local reverse 911 database is included in the reverse 911 registration text message. Mobile switching center 112 transmits the reverse 911 registration text message to mobile device 102 at step 314.

In one embodiment, in response to receiving the reverse 911 registration text message, mobile device 102 automatically displays the reverse 911 registration text message on a display of mobile device 102. Alternatively, in some embodiments, mobile device 102 may indicate/notify a user that a text message has been received. Further, in some embodiments, a user may add additional information to the reverse 911 registration text message, such as, but not limited to, a physical address where the user is located. In response to the user initiating a send command, mobile device 102 transmits the reverse 911 registration text message to the calling number associated with the local reverse 911 database at step 316.

Mobile switching center 112 forwards the reverse 911 registration text message SMS router 120 via SMSC 116. In one embodiment, SMS router 120, at step 318, converts the calling number/MDN of the local reverse 911 database to an IP address associated with the local reverse 911 database to enable registration of the contact information of mobile device 102 with reverse 911 database 140 via Internet 130. For example, in one embodiment, SMS router 120 communicates with SMS router database 125 to determine the corresponding IP address associated with a calling number.

In response to receiving the reverse 911 registration text message, reverse 911 database 140 extracts the information from the text message and adds the contact information associated with mobile device 102 to reverse 911 database 140 at step 320. At step 322, reverse 911 database 140 transmits an acknowledgment to mobile device 102 to indicate successful inclusion of the contact information of mobile device 102 to reverse 911 database 140, with sequence diagram 300 terminating thereafter.

Figure 4:
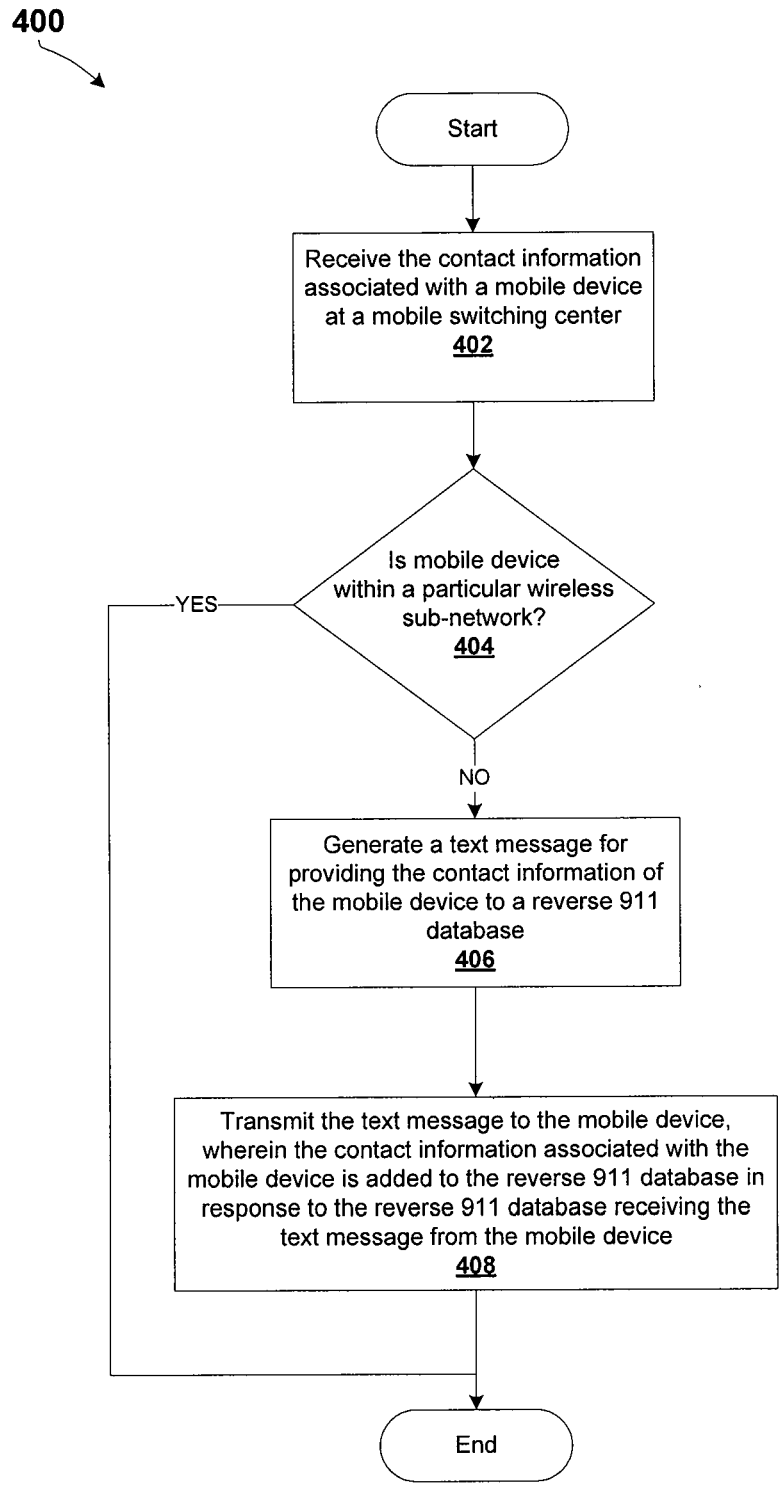
FIG. 4 is an embodiment of a process performed by a mobile switching center for providing contact information associated with a mobile device to a reverse 911 database.

FIG. 4 is an embodiment of a process 400 performed by a mobile switching center, such as, but not limited to, mobile switching center 112, for providing contact information associated with a mobile device to a reverse 911 database. Process 400 begins with the mobile switching center receiving the contact information associated with a mobile device at step 402. In some embodiments, data store 122 also receives an identifier associated with a base transceiver station communicating with the mobile device. At step 404, the mobile switching center determines whether the mobile device is within a particular wireless sub-network, such as, but not limited to, a wireless sub-network associated with an area code assigned to the mobile device. If the mobile device is within the particular wireless sub-network, process 400 terminates. However, if the mobile device is not within the particular wireless sub-network, the process generates a text message for providing the contact information of the mobile device to a reverse 911 database at step 406. At step 408, the process transmits the text message to the mobile device and the contact information associated with the mobile device is added to the reverse 911 database in response to the reverse 911 database receiving the text message from the mobile device, with process 400 terminating thereafter.

Figure 5:
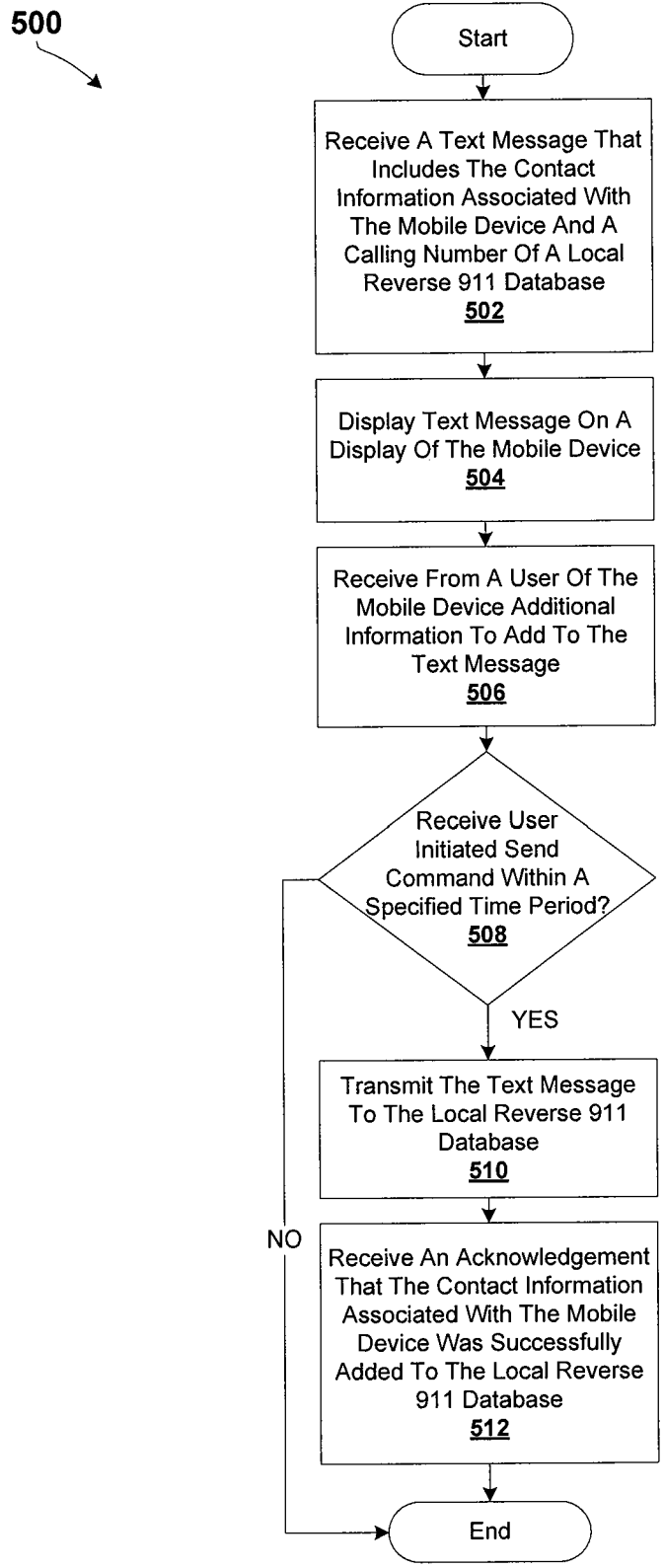
FIG. 5 is an embodiment of a process performed by a mobile device for providing contact information associated with the mobile device to a reverse 911 database.

FIG. 5 is an embodiment of a process 500 performed by a mobile device, such as, but not limited to, mobile device 102, for providing contact information associated with the mobile device to a reverse 911 database. Process 500 begins, at step 502, with the mobile device receiving a text message that includes the contact information associated with the mobile device and a calling number of a local reverse 911 database. At step 504, the process displays the text message on a display of the mobile device. The process receives from a user of the mobile device additional information to add to the text message at step 506. In some embodiments, step 506 may be omitted. At step 508, the process determines whether a user initiated send command is received within a specified time period, such as, but not limited to, 30 seconds. If a user initiated send command is not received within the specified time period, process 500 terminates. However, if a user initiated send command is received within a specified time period, the process transmits the text message to the local reverse 911 database at step 510. In some embodiments, at step 512, the process receives an acknowledgement that the contact information associated with the mobile device was successfully added to the local reverse 911 database, with process 500 terminating thereafter.

Figure 6:
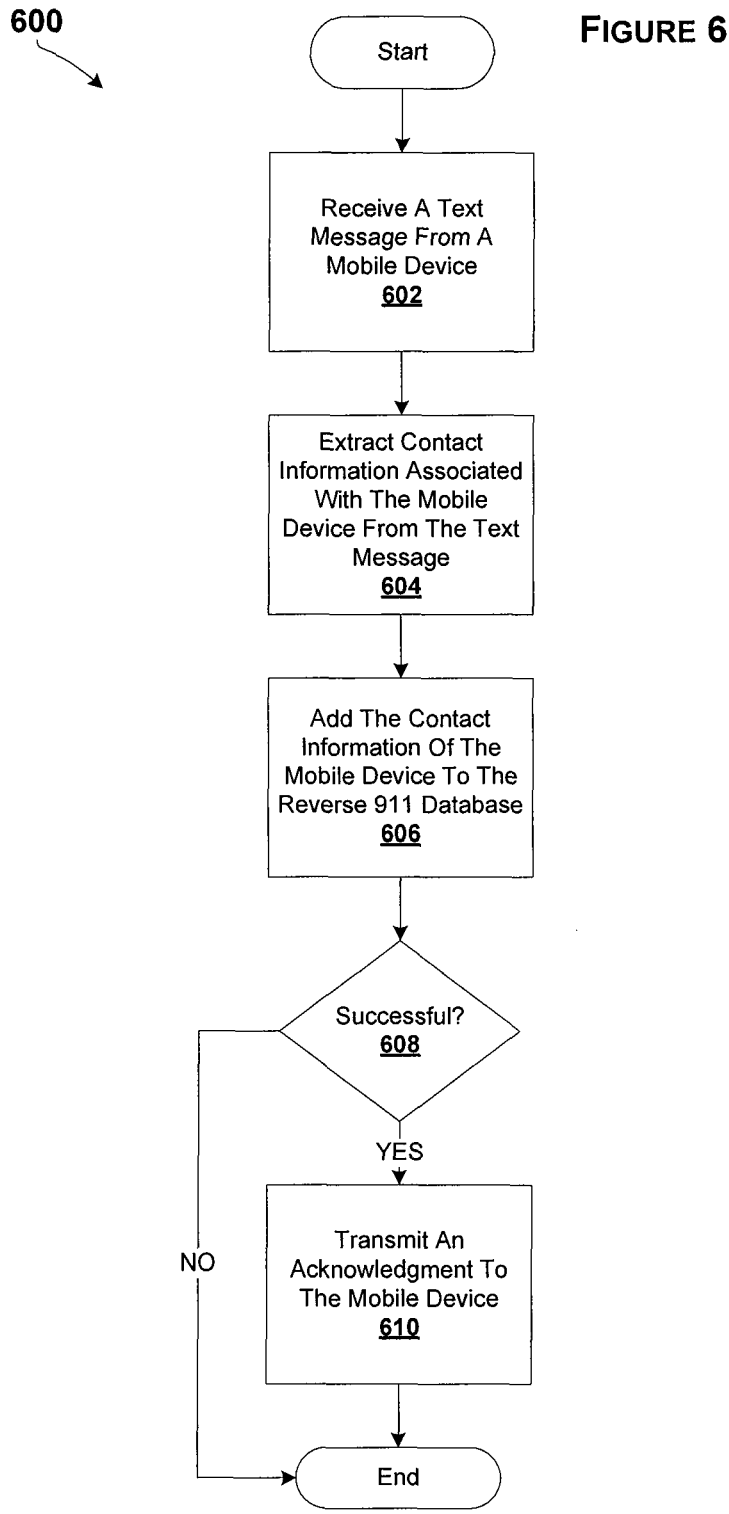
FIG. 6 is an embodiment of a process performed by a reverse 911 database for adding contact information associated with a mobile device to the reverse 911 database.

FIG. 6 is an embodiment of a process 600 performed by a reverse 911 database, such as, but not limited to, reverse 911 database 140, for adding contact information associated with a mobile device to the reverse 911 database. Process 600 begins, at step 602, with the reverse 911 database receiving a text message from a mobile device. At step 604, the process extracts the contact information associated with the mobile device from the text message. The process adds the contact information associated with the mobile device to the reverse 911 database at step 606. At step 608, the process determines whether the contact information associated with the mobile device was successfully added to the reverse 911 database. If the contact information associated with the mobile device was not successfully added to the reverse 911 database, process 600 terminates. In some embodiments, if the contact information associated with the mobile device was not successfully added to the reverse 911 database, the reverse 911 database may transmit an error message/acknowledgement to the mobile device. If at step 608, the contact information associated with the mobile device was successfully added to the reverse 911 database, the reverse 911 database transmits an acknowledgment to the mobile device indicating a successful inclusion of the contact information associated with the mobile device to the reverse 911 database, with process 600 terminating thereafter.

FIG. 7 depicts an embodiment of a text message 700 for providing contact information associated with a mobile device 102 to a reverse 911 database. In the depicted embodiment, mobile device 102 displays text message 700 on a display 702. In some embodiments, display 702 may include touch screen capabilities.

In one embodiment, text message 700 includes a title/heading 704, such as, but not limited to, "Reverse 911 Registration." In some embodiments, title/heading 704 may be used by mobile device 102 to identify/recognize text message 700 as a reverse 911 registration text message. In some embodiments, text message 700 may also include a reverse 911 calling number 706 (e.g., 527-334-3984) for calling the reverse 911 database. Text message 700 may also include a user name 706 and a callback number 708 (e.g., the mobile directory number) associated with mobile device 102. Callback number 708 is used to call mobile device 102 in the event the reverse 911 database is used to broadcast an alert message. Additionally, in some embodiments, text message 700 includes a location prompt 712 to enable a user to enter/add additional information to text message 700, such as, but not limited to, a physical address associated with the user's location. Further, in some embodiments, text message 700 may display a send command 714. For example, in one embodiment, a user may transmit text message 700 by pressing button 716 on mobile device 102. Alternatively, in some embodiments, if display 702 includes touch screen capabilities, a user may simply touch send command 714 to transmit text message 700 to a local reverse 911 database.

Accordingly, the disclosed embodiments provide an automated method for registering the contact information of mobile devices, such as, but not limited to, cellular phone numbers with a service 911 service. In one embodiment, a mobile switching center receives the contact information of a mobile device. If the mobile switching center determines that the mobile device is not located within a particular wireless sub-network, such as, but not limited to, a wireless sub-network associated with an area code registered to the mobile device, the mobile switching center generates a reverse 911 registration text message and transmits the reverse 911 registration text message to the mobile device. A user of the mobile device may then transmit the reverse 911 registration text message to a local reverse 911 database to have the contact information associated with the mobile device added to the local reverse 911 database.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing contact information associated with an out of area mobile device to a reverse 911 database, the method comprising:
   receiving identifying information associated with a mobile device at a mobile switching center;
   determining whether the mobile device is within a particular wireless sub-network;
   responsive to the mobile device not being within the particular wireless sub-network, generating a message for providing contact information of the mobile device to the reverse 911 database;
   determining an Internet Protocol ("IP") address of the reverse 911 database for contacting the reverse 911 database over an IP-based packet-switching network; and
   transmitting the message to the mobile device and the IP address to the mobile device, the text message being configured to cause the reverse 911 database to add the contact information to the reverse 911 database in response to the mobile device sending the contact information to the reverse 911 database over the IP-based packet-switching network.

2. The method of claim 1, further comprising:
   incorporating the IP address in the message.

3. The method of claim 1, wherein the message is a text message.

4. The method of claim 1, wherein receiving the identifying information associated with the mobile device at the mobile switching center comprises acquiring a mobile directory number of the mobile device and an identifier associated with a base transceiver station communicating with the mobile device.

5. The method of claim 1, wherein determining whether the mobile device is within the particular wireless sub-network comprises determining whether the mobile device is within a wireless sub-network of an area code associated with the mobile device.

6. The method of claim 1, further comprising responsive to the mobile device being within the particular wireless sub-network, terminating the method.

7. The method of claim 1, wherein the identifying information comprises the contact information.

8. The method of claim 7, wherein generating the message for providing the contact information of the mobile device to the reverse 911 database includes incorporating in the message predefined text, the contact information of the mobile device, and the IP address into the text message.

9. The method of claim 1, wherein the message includes a request for additional user provided information.

10. A method for providing contact information associated with a mobile device to a reverse 911 database, the method comprising:
    providing, with the mobile device, identifying information to a mobile switching center;
    receiving, by the mobile device, a message from the mobile switching center and an Internet Protocol ("IP") address of the reverse 911 database for contacting the reverse 911 database over an IP-based packet-switching network;
    transmitting the contact information associated with the mobile device to the reverse 911 database over the IP-based packet-switching network;
    receiving reverse 911 alert messages that are sent using the reverse 911 database,
    wherein the identifying information comprises the contact information associated with the mobile device, and wherein the message comprises the contact information associated with the mobile device;
    and further receiving an acknowledgement that the contact information associated with the mobile device was successfully added to the local reverse 911 database.

11. The method of claim 10, further comprising receiving, from a user of the mobile device, additional information to add to the contact information.

12. The method of claim 10, further comprising:
    displaying the message for a user; and
    receiving user input to send the contact information to the reverse 911 database;
    wherein the contact information is transmitted in response to the user input.

13. The method of claim 10, wherein the message from the mobile switching center is a text message.

14. A data processing system comprising:
    a memory in communication with a processing unit, the memory containing computer usable program code; and
    the processing unit operable to execute the computer usable program code to:
    receive identifying information associated with a mobile device at a mobile switching center;
    determine whether the mobile device is within a particular wireless sub-network;
    responsive to the mobile device not being within the particular wireless sub-network, generate a message for providing contact information of the mobile device to the reverse 911 database;
    determine an Internet Protocol ("IP") address of the reverse 911 database for contacting the reverse 911 database over an IP-based packet-switching network; and
    transmit the message to the mobile device and the IP address to the mobile device, the text message being configured to cause the reverse 911 database to add the contact information to the reverse 911 database in response to the mobile device sending the contact information to the reverse 911 database over the IP-based packet-switching network.

15. The data processing system of claim 14, wherein the processing unit further executes the computer usable program code to:

incorporate the IP address in the message.

16. The data processing system of claim 14, wherein the message comprises the contact information.

17. The data processing system of claim 14, wherein the message is a text message.

18. The data processing system of claim 14, wherein the processing unit further executes the computer usable program code to determine whether the mobile device is within a wireless sub-network of an area code associated with the mobile device.

* * * * *